June 10, 1930.  E. FREIVOGEL  1,762,168
TIRE REMOVER AND CARRIER
Filed July 13, 1928   2 Sheets-Sheet 1
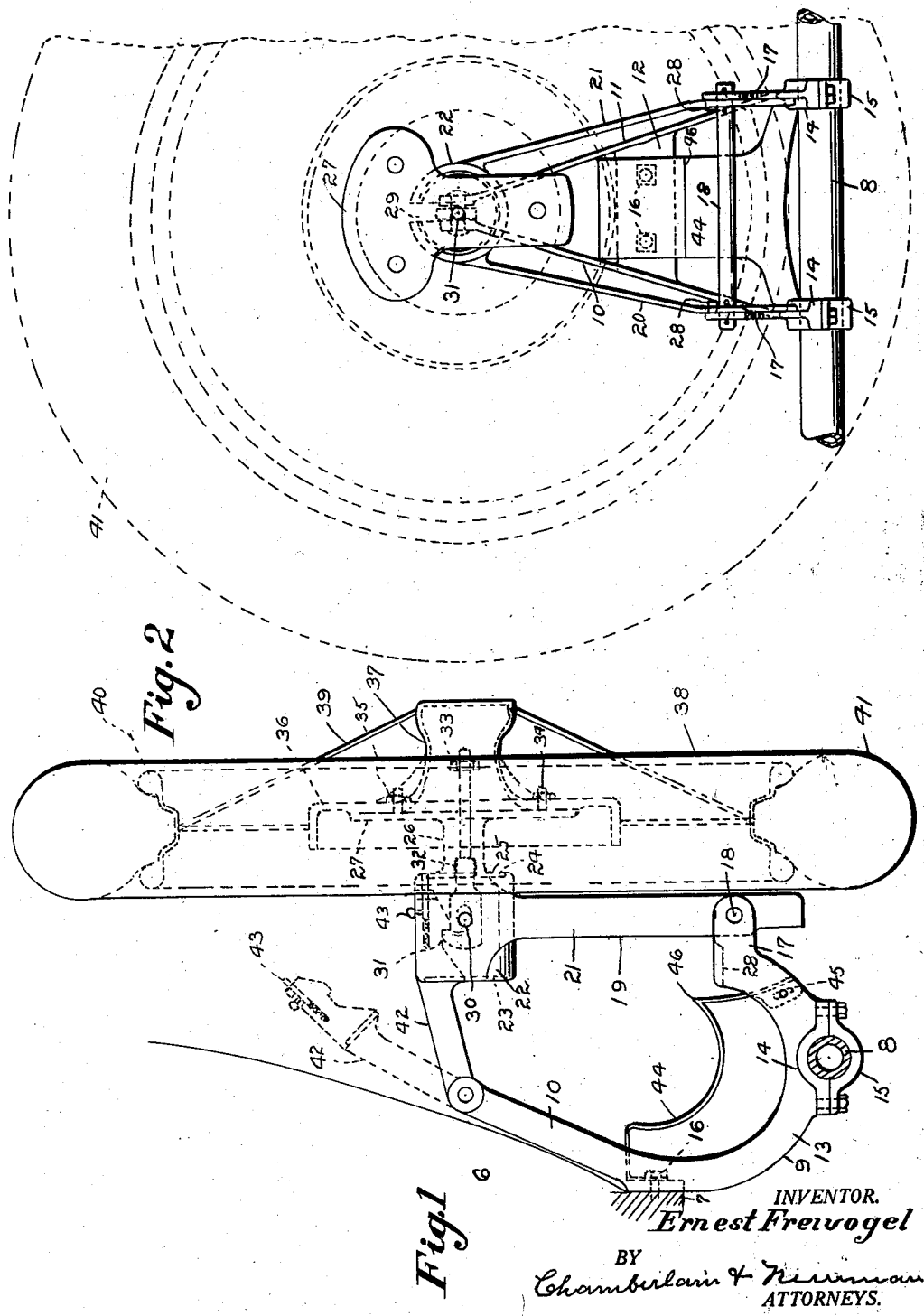
INVENTOR.
Ernest Freivogel
BY
Chamberlain & Newman
ATTORNEYS.

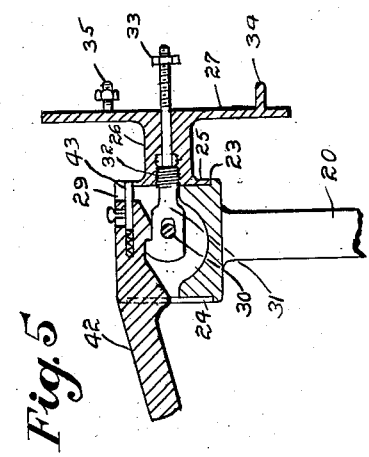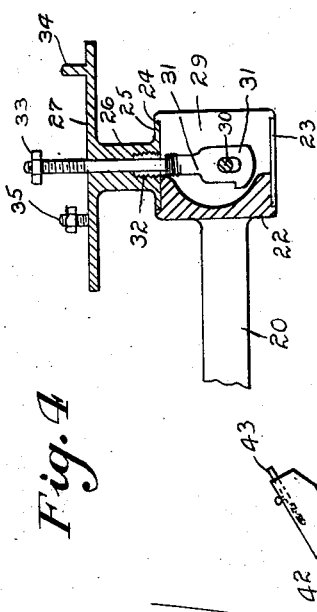

Patented June 10, 1930

1,762,168

UNITED STATES PATENT OFFICE

ERNEST FREIVOGEL, OF RIDGEFIELD, CONNECTICUT, ASSIGNOR OF ONE-HALF TO RICHARD A. JACKSON, OF RIDGEFIELD, CONNECTICUT

TIRE REMOVER AND CARRIER

Application filed July 13, 1928. Serial No. 292,513.

This invention relates to new and useful improvements in combined wheel carrier, work table and tire remover and comprises such a device particularly designed and adapted for the new Ford automobile, and wheels having rims of the so-called drop-center type.

An object of the invention is to provide a device of the character stated and which is particularly adapted for attachment to the new Ford automobile and which is further designed to accommodate the particular wheel used on that car.

A further object of the invention is to provide a device for attachment to or to be built as a part of the automobile mentioned and which will efficiently perform the function of a carrier for the spare wheel; a work-bench for holding the wheel while a damaged tire is replaced; and which also includes means for assisting in breaking the tire loose from the wheel rim.

Yet another object is to provide a combined wheel rack or carrier and work-bench for the new Ford automobile, which may be folded into a vertical position at the rear of the car to support a spare wheel in such position when the device is used as a carrier or rack, and which may be swung into a horizontal position to support a wheel in such position when the device is used as a work-bench, either in removing or applying a tire to a wheel.

An additional object is to provide a device having the characteristics indicated and including means for maintaining it in either of its positions.

A further object is to provide a wheel rack and work-bench wherein when the device is used as a work-bench the wheel may be tilted, the device including a portion against which the tire may be forced when the wheel is tilted whereby to break the tire loose from the wheel rim. As will be particularly evident from the embodiment herein described, the invention, in its broader aspect, further comprises means applicable generally to the removal of tires, irrespective of whether or not the work-bench be used as a tire-rack for attachment to an automobile.

Another object is to provide a device of the kind indicated and which is of inexpensive construction, which may be readily attached and which may be easily operated or used.

In the accompanying drawings the invention is shown in detail and so described in the following specification. However, this disclosure is for the purpose of making clear the principles of the invention and since many modifications will suggest themselves, reference must be had to the annexed claims, within the scope of which, various changes may be made without departing from the spirit of the invention.

In said drawings:

Fig. 1 is a side elevational view showing the device in use as a spare wheel and tire carrier, and attached to the rear of a new Ford automobile, a portion of which is shown;

Fig. 2 is a front elevation of the device;

Fig. 3 is a view somewhat similar to Fig. 1 but showing the device in use as a work-bench, a wheel being shown in position, and in section;

Fig. 4 is a detail section through the rack body or head and the wheel carrier when the parts are in the position shown in Fig. 3; and Fig. 5 is a similar view, the parts being in the position shown in Fig. 1.

Referring in detail to the drawing, the rear portion of the new Ford automobile is indicated at 6 and the same includes a beam 7 and a cross bar 8 on which beam and bar my combined wheel carrier and work-bench is mounted.

The device comprises a mounting piece or support 9 of substantially A-shape, including side bars or arms 10 and 11 and a connecting piece or plate 12 disposed between the said bars. As shown, the arms 10 and 11 are each somewhat hook-shaped, curving to form an arc shaped portion 13. These portions 13 each carry the upper portion 14 of a clamp, which portions with the complementary portions 15 of the clamps serve to rigidly secure the support 9 to the cross-bar 8.

Support 9 is secured at a second point by means of bolts 16 passing through the connecting piece or web 12 and into the beam 7. The free ends of the arc portions 13 of the arms 10 and 11 are outturned to provide substantially horizontally extending portions 17 connected by a rod or bar 18 on which is pivotally mounted a rack 19.

Briefly, the rack 19, which is somewhat in the shape of an inverted V, comprises side arms 20 and 21 and a connecting portion or head 22. Head 22 is recessed in each end to provide a pair of seats 23 and 24 for rotatably receiving the flange 25 on the hub 26 of a wheel support, which support also includes a somewhat T-shaped wheel carrier or work table 27.

When the rack 19 is in vertical position the ends of arms 20 and 21 extend below the portions 17 of arms 10 and 11 as shown best in Fig. 1. However, when the rack 19 is moved to a horizontal position these extending ends engage the under sides of lugs 28 carried by the portions 17, whereby to limit the movement of the rack and maintain it in a horizontal position.

Head 22 is slotted as at 29 and a pin 30 crosses said slot to secure a catch bolt 31 therein. Bolt 31 has an elongated slot in which pin 30 is disposed and accordingly the bolt has certain longitudinal movement. The hub 26 has a recess into which may be threaded the intermediate portion 32 of the bolt 31, while the outer end of the bolt projects beyond the work table 27 and is threaded to receive a nut 33.

Also, table 27 is provided with a lug 34 and a pair of threaded studs 35 which studs and lug are spaced to enter bolt holes in the flange 36 of the metal hub portion 37 of the wheel 38 used on the new Ford. This wheel also includes wire spokes 39 and a drop-center rim 40 mounting a pneumatic tire 41.

When the device is used as a carrier for a spare wheel and tire, the parts are disposed in the relative positions shown in Figs. 1 and 2. With the parts in this position a latch 42, which is pivoted between the upper ends of the arms 10 and 11, engages the bolt 31 to secure the parts.

After the latch 42 and the bolt 31 are in overlapping relation, the wheel 38 may be rotated to thread the hub 26 on to the bolt 31 to tightly secure the parts in place by drawing the latch 42 and bolt 31 into engagement. With the parts tightly in place a spring pressed bolt 43 prevents casual rotation of the wheel 38. In this position of the parts the flange 25 is in engagement with seat 23 of the head 22.

To use the device as a work-bench it is but necessary to withdraw bolt 43 and loosen the wheel on bolt 31 and swing the parts into the position shown in Fig. 3. Here the flange 25 of hub 26 is in engagement with seat 24 of the head 22. With the parts in this position it is possible to tilt the wheel.

Means are provided for breaking the tire loose from the wheel. This means includes a plate 44 one end of which is secured by the bolts 16 and the other end of which is bifurcated and secured to the arc shaped portions of the arms 10 and 11 as at 45.

Plate 44 is bent or shaped to provide a corner or edge 46 against which the tire 41 is brought when the wheel 38 is tilted as described. By tilting the wheel and bringing the tire against the edge 46, the tire is loosened and thereby slightly rotating the wheel and again tilting it and pressing the tire against edge 46 the tire is broken loose from the rim. This operation should of course be repeated about the circumference of the wheel rim.

Having thus described the invention, what I claim is:

1. In combination, a support adapted to be secured at two spaced points to the rear portion of an automobile, said support including a pair of spaced arms, a rod extending between said arms, a rack pivotally mounted on said rod and adapted to occupy a vertical and a horizontal position, a latch pivotally mounted by said arms and adapted to secure the rack in a vertical position, means carried by said rack and rotatably and tiltably mounting a wheel, and means adapted to engage a tire on the wheel when the latter is tilted to break the tire loose from the wheel rim.

2. In combination, a pivotally mounted rack including a head, a work table including a hub portion, a catch-bolt pivotally secured to said head, a latch for engagement with said catch to secure the rack in one position, and said hub having threaded connection with said catch-bolt whereby on threading the parts together the catch is drawn into tight engagement with the latch and the work table is rigidly secured.

3. The combination as in claim 2 including a bolt carried by the head and adapted to hold the work table against casual rotation on the catch-bolt.

4. In combination, a work table for tiltably mounting a wheel carrying a tire, and means associated with said table and adapted to be engaged by the tire when the wheel is tilted, whereby to break the tire loose from from the wheel rim.

5. In combination, a support adapted for attachment to a car, an arm adapted to support a wheel rim, said arm being pivotally connected to the first-mentioned support, and tire engaging means mounted on said support in position to receive a tire for loosening the same with respect to the wheel rim in response to movement of said arm.

Signed at Bridgeport, in the county of Fairfield and State of Connecticut, this 11th day of July, A. D. 1928.

ERNEST FREIVOGEL.